United States Patent [19]

Herndon

[11] Patent Number: 4,720,064
[45] Date of Patent: Jan. 19, 1988

[54] EJECTION SEAT RESTRAINT/PARACHUTE HARNESS

[75] Inventor: Gerald F. Herndon, Bellevue, Wash.

[73] Assignee: The Boeing Company, Seattle, Wash.

[21] Appl. No.: 35,200

[22] Filed: Apr. 7, 1987

Related U.S. Application Data

[63] Continuation of Ser. No. 782,131, Sep. 30, 1985, abandoned.

[51] Int. Cl.⁴ .............................................. B64D 25/06
[52] U.S. Cl. ......................... 244/122 AG; 244/122 B; 244/151 R
[58] Field of Search ........ 244/122 R, 122 AG, 122 B, 244/151 A, 151 R, 141, 122 A, 122 AE, 122 AH; 280/801, 806, 808; 297/465, 468, 474, 480, 481, 483, 484

[56] References Cited

U.S. PATENT DOCUMENTS

| | | | |
|---|---|---|---|
| 1,332,143 | 2/1920 | Osterday | 244/147 |
| 1,909,176 | 5/1933 | Hoffman . | |
| 2,192,109 | 2/1940 | Smith | 244/122 B |
| 2,408,088 | 9/1946 | Miller et al. | 244/151 |
| 2,448,066 | 8/1948 | Wilson | 244/151 |
| 2,475,631 | 7/1949 | Miller et al. | 244/151 R |
| 2,519,352 | 8/1950 | Carroll | 244/151 R |
| 2,542,248 | 2/1951 | Heffernan et al. | 244/122 B |
| 2,643,836 | 6/1953 | Carroll | 244/151 |
| 2,725,204 | 11/1955 | Horning | 244/151 |
| 2,892,602 | 6/1959 | Servanty | 244/141 |
| 2,986,362 | 5/1961 | Gimalouski | 244/151 |
| 3,154,272 | 10/1964 | Gold | 244/151 |
| 3,559,932 | 2/1971 | Ternes | 244/151 |
| 3,692,262 | 9/1972 | Gaylord | 244/151 A |
| 3,757,744 | 9/1973 | Pravaz | 119/96 |
| 3,954,234 | 5/1976 | Frost et al. | 244/151 A |
| 4,378,921 | 4/1983 | Allen et al. | 244/151 R |
| 4,396,228 | 8/1983 | Go | 297/468 |

FOREIGN PATENT DOCUMENTS

| | | | |
|---|---|---|---|
| 127995 | 5/1945 | Australia | 244/151 R |
| 1289747 | 2/1969 | Fed. Rep. of Germany . | |
| 2315289 | 6/1975 | France . | |

Primary Examiner—Joseph F. Peters, Jr.
Assistant Examiner—Lynn M. Fiorito
Attorney, Agent, or Firm—Joan H. Pauly; Delbert J. Barnard

[57] ABSTRACT

A continuous main strap (10) has a front H-shaped configuration and a rear X-shaped configuration. Strap (10) extends from one side of the waist diagonally up and across the back, down the front, across and under the buttocks, up the front, and diagonally down and across the back to the opposite side of the waist. A chest strap (30) completely encircles the chest and forms the horizontal portion of the "H". An integral thigh strap and lap belt (20) is attached to the buttocks portion (16) of strap (10) and extends upwardly and laterally outwardly to side waist fittings (56) on vertical front webs (14) of strap (10), through fittings (56), and inwardly to an adjustable connector (26). Each fitting (56) has a cam lock snubber (66) for releasably securing strap (20) against movement relative to fitting (56).

26 Claims, 7 Drawing Figures

EJECTION SEAT RESTRAINT/PARACHUTE HARNESS

This application is a continuation of application Ser. No. 782,131, filed Sept. 30, 1985, now abandoned.

TECHNICAL FIELD

This invention relates to torso restraint/parachute harnesses and, more particularly, to such a harness that has a continuous strap providing a front "H" and back "X" configuration, a midtorso strap encircling the chest, and thigh straps which are attached to a buttocks loop of the continuous strap and which integrally form a front lap belt.

BACKGROUND ART

There are several different torso restraint/parachute harness arrangements currently being used in high performance military aircraft. In some of these arrangements, the harness is mounted to the ejection seat and is adjustable to any size crew member. In other arrangements, the harnesses are fitted to individual crew members and are considered personal equipment. Each of these two types of arrangements, adjustable or individually fitted, has advantages and disadvantages.

The United States Air Force and the United States Navy both use a type of individually fitted harness. The air Force harness is relatively simple but is not particularly comfortable when suspended from the parachute risers. The harness requires a separate lap belt for lower torso restraint. The lap belt is sometimes inadequate for preventing submarining under combined downward and forward g forces. "Submarining" occurs when the pelvis rotates and slips underneath the lap belt. The harness used by the Navy is integrated into a torso suit for easier donning and greater comfort. The harness eliminates the submarining problem by incorporating lap belt fittings which securely connect the harness to the seat. A major drawback of the Navy fitted harness is that it has a relatively high cost and each harness can only be used for one individual crew member.

Recently, a number of proposals have been made for providing an integrated, seat-mounted harness system. One such proposal incorporates a single quick disconnect fitting which accepts four separate strap connections. This arrangement facilitates quick egress, but the location of the single point connection and the routing of the straps are not ideal from the standpoint of crew member support and strap loading. In addition, the proposed system does not include a chest strap to prevent the seat occupant's shoulders from slipping out of the harness.

Parachute and/or restraint harnesses are disclosed in each of the following: U.S. Pat. No. 1,909,176, granted May 16, 1933, to E. L. Hoffman; No. 2,408,088, granted Sept. 24, 1946, to J. Miller et al.; No. 2,448,066, granted Aug. 31, 1948, to H. Wilson; No. 2,475,631, granted July 12, 1949, to J. Miller et al.; No. 2,643,836, granted June 30, 1953, to C. E. Carrol; No. 2,725,204, granted Nov. 29, 1955, to J. W. Horning; No. 2,986,362, granted May 30, 1961, to E. A. Gimalouski; No. 3,154,272, granted Oct. 27, 1964, to D. Gold; No. 3,559,932, granted Feb. 2, 1971, to M. N. Ternes; No. 3,692,262, granted Sept. 19, 1972, to J. A. Gaylord; No. 3,757,744, granted Sept. 11, 1973, to M. H. Pravaz; No. 3,954,234, granted May 4, 1974, to R. H. Frost et al.; and No. 4,378,921, granted Apr. 5, 1983, to R. E. Allen et al.

Such harnesses are also disclosed in German printed patent application No. 1,289,747, dated Feb. 20, 1969; and French printed patent application No. 75 19554, made public Jan. 21, 1977.

Ternes discloses a harness having what is described as "an integral arrangement of straps". The harness has a lap belt that extends across the front and is sewn onto the vertical straps. The lap belt attaches to the lap belt restraining system of the parachute. The harness does not have any strap that encircles the chest. Frost et al. disclose a harness that is attached to a survival kit that forms a part of the portion of the seat on which the seat occupant sits. The Frost et al. harness has a bib strap but no chest-encircling strap and no lap strap. The Allen et al. harness has a single fastening means and a separately formed lap belt. The harness has straps that surround the chest, but the center back portion of the chest-surrounding straps is formed by a separate strap so that the load path does not encircle the chest.

The above patents and the prior art that is discussed and/or cited therein should be studied for the purpose of putting the present invention into proper persepctive relative to the prior art.

DISCLOSURE OF THE INVENTION

The subject of the invention is an ejection seat restraint/parachute harness. According to an aspect of the invention, the harness comprises continuous strap means for providing a continuous load path beginning on one side of the waist of a wearer and running diagonally up and across the back, down the front, across and under the buttocks, up the front, and diagonally down and across the back to the opposite side of the waist. Chest strap means is provided for preventing the wearer's shoulders from slipping out of the harness. Thigh strap and lap belt means prevents the pelvis of the wearer from rotating and slipping out of position. Preferably, the chest strap means completely encircles the chest. In the preferred embodiment, the harness further includes attaching means for attaching the chest strap means to the continuous strap means at each of two opposite side front locations and at a back location where the continuous strap means crosses itself to form an X-shaped configuration.

One preferred embodiment of the attaching means includes a fitting at each of said side front locations. The chest strap means includes a back portion that extends around the back of the wearer and is attached to each of the fittings. The chest strap means also has a front portion formed by an end portion of each of two haul back straps. These haul back straps extend down opposite side front portions of the continuous strap means to the fittings, slidingly through the fittings, across the chest, and to connector means for connecting the haul back straps to an ejection seat. Preferably, the back portion of the chest strap means includes means for adjusting the chest strap means to the size of the wearer.

In another preferred embodiment of the invention, the harness includes a fitting at each of two opposite side front locations on the continuous strap means. The chest strap means includes a back portion extending around the back of the wearer and attached to each of the fittings, and a front portion extending around the front of the wearer and attached to each of the fittings. Preferably, the front portion of the chest strap means includes a latch fitting for releasably latching the chest strap means around the chest of the wearer. Also preferably, the chest strap means includes means for adjusting it to the size of the wearer.

A preferred feature of this embodiment of the invention is the inclusion in each fitting of portions for slidingly engaging a haul back strap that extends down a side front portion of the continuous strap means to the fitting, through the fitting, and laterally outwardly to connector means for connecting the haul back strap to an ejection seat. In harnesses of the invention having this preferred feature, the simplicity of the structure of the harness and the efficiency of its operation is increased by providing each fitting with two functions, attaching the chest strap means to the continuous strap means and providing routing for the haul back strap. These dual functions combine to increase the overall load path efficiencies of the harness.

Harnesses constructed in accordance with the invention also preferably include a fitting in each of two opposite side front waist locations on the continuous strap means. The thigh strap and lap belt means is integrally formed and extends generally downwardly from a first one of the waist fittings to a center portion of the continuous strap means under the buttocks, generally upwardly to and through the other waist fitting, and across the front of the waist to and through the first waist fitting. Preferably, each of the waist fittings attaches a front portion of the continuous strap means to a back portion of the continuous strap means. Also preferably, each fitting includes tightening means for adjusting the thigh strap and lap belt means to the size of the wearer. In the preferred embodiments, the harness includes adjusting means at a center waist location for adjusting the thigh strap and lap belt means to the size of the wearer. The preferred embodiment of the tightening means includes a shaft around which the thigh strap and lap belt means extends, and cam lock means for releasably locking the thigh strap and lap belt means against movement relative to the shaft. Another preferred feature of the invention is providing each waist fitting with means for anchoring the thigh strap and lap belt means to an ejection seat.

According to another aspect of the invention, the harness comprises front strap means, back strap means, and a continuous strap extending across a front portion of each thigh and the front of the waist, between opposite side portions of the front strap means, of a wearer for preventing the pelvis of the wearer from rotating and slipping out of position. Preferably, the harness also includes a fitting at each of two opposite side locations on the front strap means, and the continuous strap extends through each of such fittings. In the preferred embodiment, the harness has a chest strap that completely encircles the chest of a wearer, the front strap means has an H-shaped configuration, and the back strap means has an X-shaped configuration.

The harness of the invention is simple in construction and easy to don and doff. The strap routing arrangement of the harness, though relatively simple, provides efficient load paths. The harness of the invention is readily adjustable to any size seat occupant, and also readily lends itself to integration with an adaptive restraint system with midtorso support.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 1:
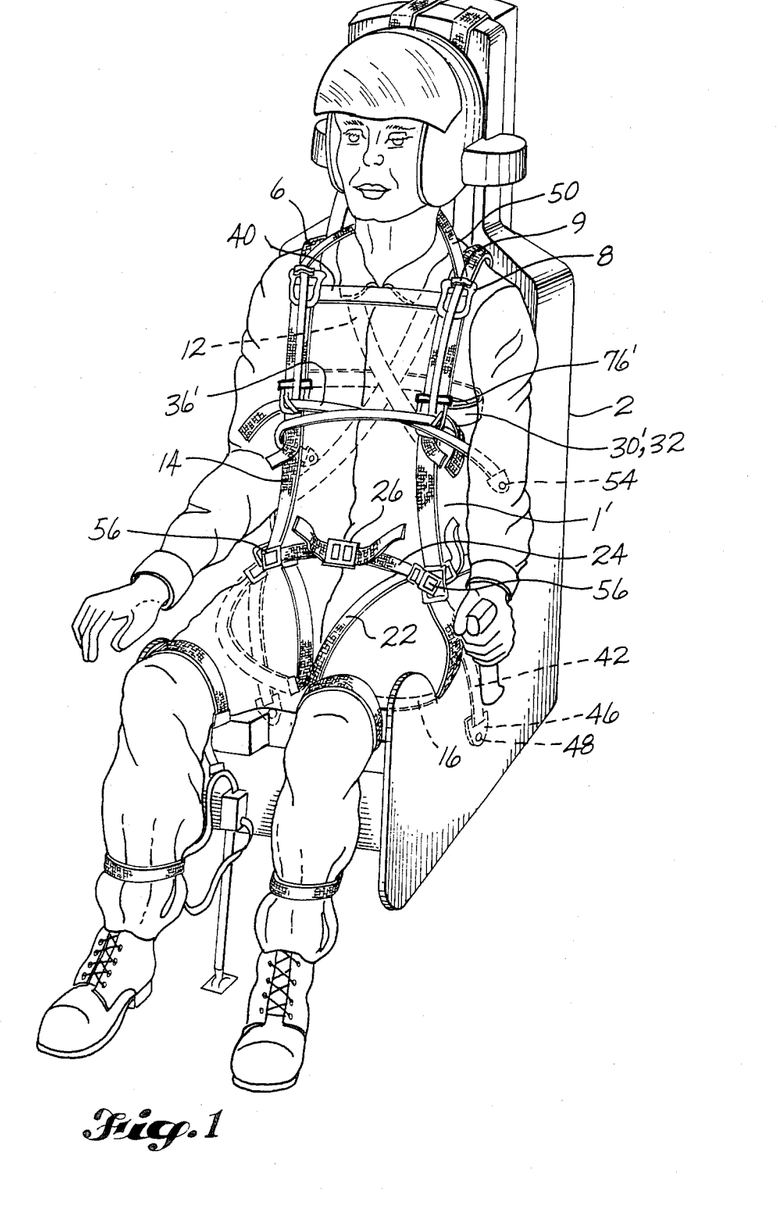
FIG. 1 is a pictorial view of an aircraft ejection seat and one of the preferred embodiments of the harness of the invention, illustrating the use of the harness to restrain a crew member.

The drawings show two embodiments of a restraint/parachute harness 1, 1' that are constructed according to the invention and that also constitute the best modes of the invention currently known to the applicant. FIG. 1 shows one preferred embodiment of the harness 1' attached to an ejection seat 2 and restraining a crew member sitting in seat 2. The seat 2 is shown and described herein for the purpose of illustrating a typical type of ejection seat with which the harness of the invention may be used to advantage. It is of course to be understood that the harness of the invention may also be used to great advantage in connection with other types of ejection seats.

Figure 2:
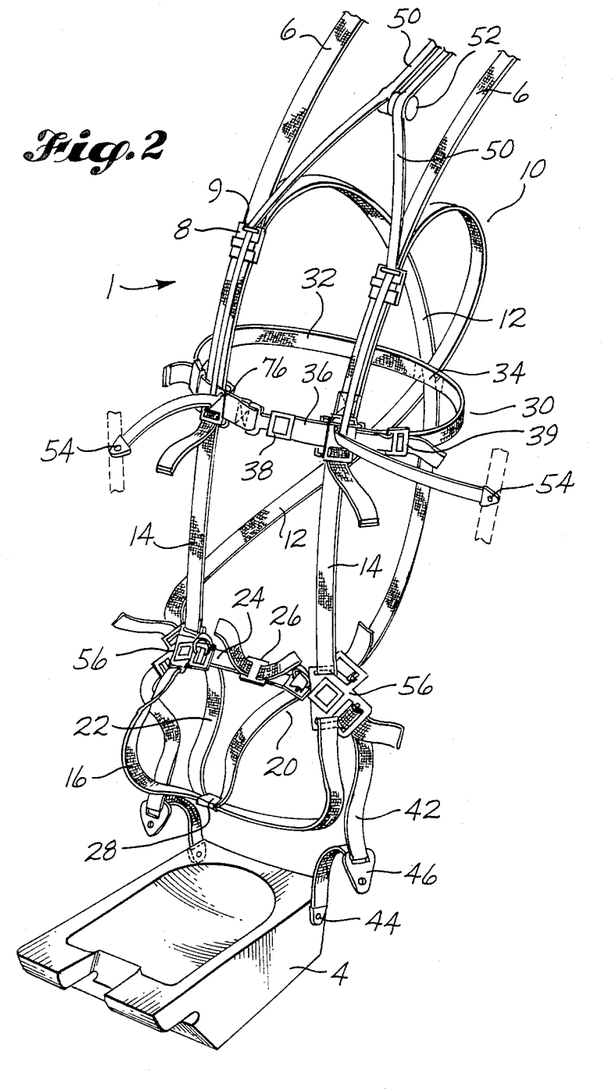
FIG. 2 is a pictorial view of another preferred embodiment of the invention, shown attached to a survival kit.

FIG. 2 shows a seat bottom survival kit 4 attached to the harness 1 of the other preferred embodiment. The survival kit 4 forms a portion of the seat bottom on which the seat occupant sits. It is attached to the harness 1 by means of two opposite releasable pin connections 44 which attach one end of each of two opposite side anchor straps 42 to the kit 4. This survival kit and attachment arrangement is preferably provided so that the survival kit 4 will automatically be carried with the seat occupant by the harness 1 upon ejection of the seat 2 from an aircraft.

Referring to FIGS. 1 and 2, both preferred embodiments of the harness 1, 1' include a continuous main strap, indicated generally by the reference number 10. The strap 10 provides an efficient continuous load path that extends diagonally up and across the back of the wearer from the waist on one side to the opposite shoulder, over the shoulder and vertically down the front on the opposite side, across and under the buttocks, vertically upwardly along said one side of the front, over the shoulder and diagonally down the back to the waist on the opposite side. This pathway of the strap 10 forms two front vertical webs 14, two back diagonal webs 12 that cross each other to form an "X", and a buttocks sling 16 extending between the two front webs 14.

Figures 5, 6, 7:
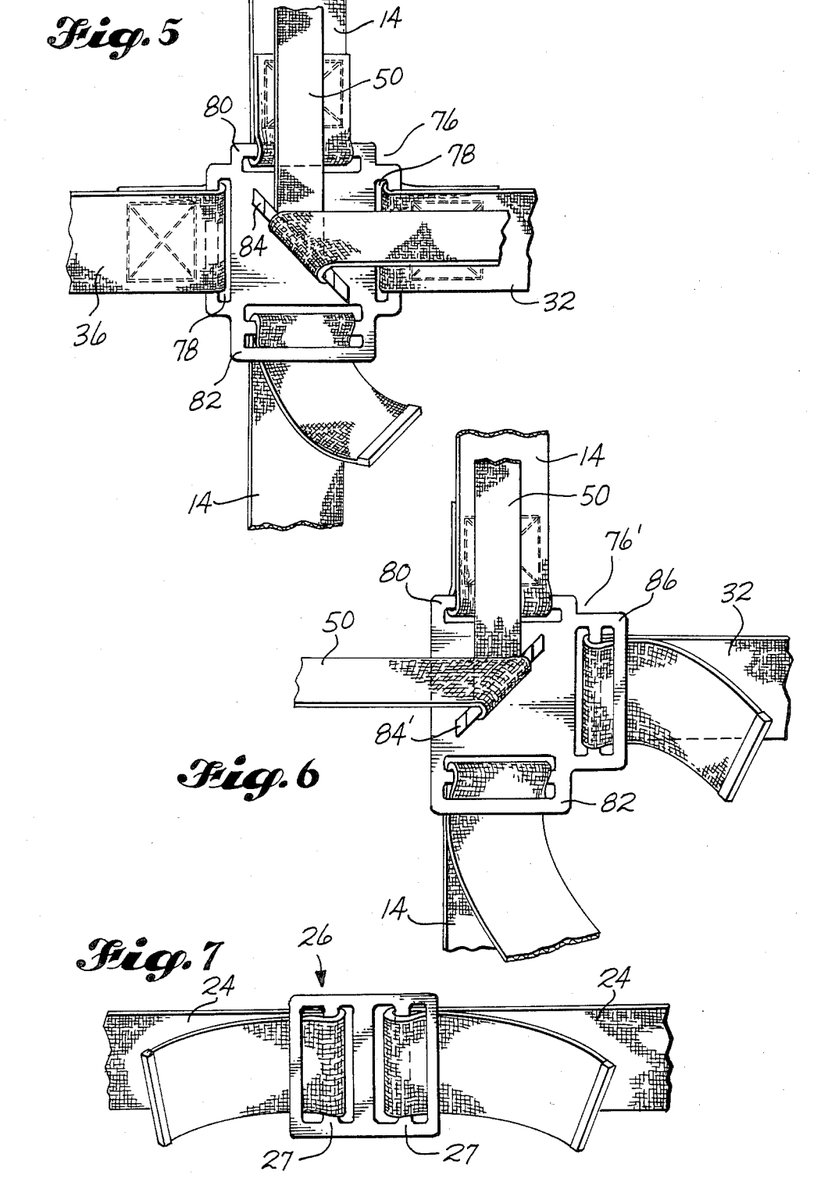
FIG. 5 is a pictorial view of the chest strap front side fitting of the embodiment shown in FIG. 2.
FIG. 6 is a pictorial view of the chest strap front side fitting in the embodiment shown in FIG. 1.
FIG. 7 is a pictorial view of the center lap belt adjustment fitting.

Each of the embodiments of the harness 1, 1' also includes a continuous thigh/lap belt strap indicated generally by the reference number 20. The strap 20 has a thigh portion 22, the center portion of which is attached to a midportion of the buttocks sling 16 at a connection point 28. From point 28, the strap 20 extends upwardly and laterally outwardly on each side to the front webs 14 of the main strap 10. The strap 20 engages each front web 14 and then extends laterally inwardly across the front of the waist of the wearer to form the lap belt portion 24 of the strap 20. At the center of the lap belt portion 24 is a front adjuster fitting 26 that adjustably engages and attached the two ends of the continuous belt 20. The fitting 26 is shown in FIG. 7. It includes two adjustable connectors 27, one for each end of the strap 20. As can be seen in FIG. 7, these connectors 27 are of a standard type commonly found in car seat belts.

Each of the preferred embodiments of the harness 1,1' also includes chest strap means 30, 30' that completely encircles the chest of the wearer. The chest strap means prevents the shoulders of a wearer from slipping out of the harness and, in combination with retraction straps 50, also prevents spinal arching during high deceleration when windblast is not present by holding the wearer against the seat 2. The two embodiments of the harness 1, 1' are essentially the same except for the construction of the chest strap measn 30, 30' and the fittings associated therewith and the provision of a bib strap 40 in the embodiment 1' shown in FIG. 1. In each of the embodiments, the chest strap means 30, 30' includes a back portion 32 that extends around the back of the wearer and is attached to each of the back diagonal webs 12 of the main strap 10 at an attachment point 34 where the webs 12 cross each other.

In the embodiment shown in FIG. 2, the front portion 36 of the chest strap means is in effect a continuation of the back portion 32 and extends across the front of the chest of the wearer. The front portion 36 forms, with vertical front webs 14, an H-shaped configuration. Preferably, the front portion 36 is provided with a front buckle 38, of a type commonly used in seat belts in automobiles and aircraft, for releasing the wearer from the chest strap means 30. Referring to FIGS. 2 and 5, each of the front webs 14 of the main strap 10 has a chest fitting 76 to which the chest strap 30 is attached to connect the chest strap 30 to the front webs 14. The chest fitting 76 includes two slots 78 for receiving the front end of the back portion 32 of the chest strap 30 and one ond of the front portion 36. Each of these ends of the back and front portions 32,36 is fixed to the chest fitting 76 by extending through the corresponding slot 78, folding back on itself, and being sewn in an overlapping position with itself. This attaching arrangement is best seen in FIG. 5. Preferably, the back portion 32 of the chest strap 30 has a side adjustable fitting 39 on each side laterally outwardly of the chest fitting 76. This adjustable fitting 39 engages one end of the back portion 32 of chest strap 30 in the same fixed manner that the chest fitting 76 engages the chest strap 30, and another end of back portion 32 in the same adjustable manner that the front waist adjuster fitting 26 engages the two ends of the continuous thigh/lap belt strap 20.

The chest fitting 76 shown in FIGS. 2 and 5 also includes an upper fixed connector 80 for connecting one end of the front vertical web 14 of the continuous main strap 10 to the fitting 76. This connection is of the same type as the connection between fitting 76 and the ends of the chest strap 30. The fitting 76 also has an adjustable lower connector 82 that adjustably engages an end of the front web 14 in the same manner that the fitting 26 engages strap 20. By this arrangement, the front web 14 is securely attached to the fitting 76, and the length of the front web 14 is made adjustable to fit the size of the wearer.

Preferably, a retraction strap guide fitting 84 is incorporated into the chest fitting 76. As shown in FIGS. 2 and 5, the guide fitting 84 slidingly receives a haul back or retraction strap 50. The strap 50 extends downwardly and forwardly from a haul back mechanism (not shown) over a guide bearing 52 and slidingly through guide fitting 84 to a releasable pin connection 54. The pin connection 54 is of a known type and, therefore, will not be described further herein.

The embodiment of the chest strap means 30' shown in FIG. 1 has a back portion 32 formed in the same manner as the back portion 32 of the other embodiment of the chest strap means 30. This back portion 32 also preferably includes side adjustment fittings 39 or other means of adjusting its length. The front portion 36' of the chest strap means 30' is formed by the lower ends of the two retraction straps 50. Instead of extending laterally outwardly from the front webs 14, the retraction straps 50 in this embodiment extend across the chest of the wearer to the opposite side and are attached to the ejection seat by releasable pin connections 54. In harnesses of the invention incorporating this modified form of the chest strap means 30', an extra bib strap 40 is required. In the preferred embodiment shown in FIG. 1, the bib strap 40 extends across the upper chest of the wearer above the chest strap means 30' between the front webs 14 and parachute connection fittings 8.

The chest fittings 76' used in connection with the embodiment of the chest strap means 30' shown in FIG. 1 is best seen in FIG. 6. The fitting 76' has an upper fixed connector 80 and a lower adjustable connector 82 for engaging the front web 14 in the same manner that the front web 14 is engaged by the fitting 76 in the embodiment shown in FIG. 2. The fitting 76' also has a side adjustable connector 86 that engages the front end of the back portion 32 of the chest strap means 30', as shown in FIG. 6. This adjustable connector 86 functions in the same manner as the waist connector 26. In this embodiment of the chest strap means 30' and in the embodiment 30 shown in FIG. 2, the adjustability of the back portion 32 may be provided either by side adjustable fittings 39, such as those shown in FIG. 2, or by the adjustable connection 86 shown in FIG. 6. Preferably, the fitting 76' incorporates a strap guide fitting 84' for a retraction strap 50. The guide fitting 84' is the same as the fitting 84 shown in FIG. 5, except that it directs the retraction strap 50 laterally inwardly rather than laterally outwardly.

Figure 3:
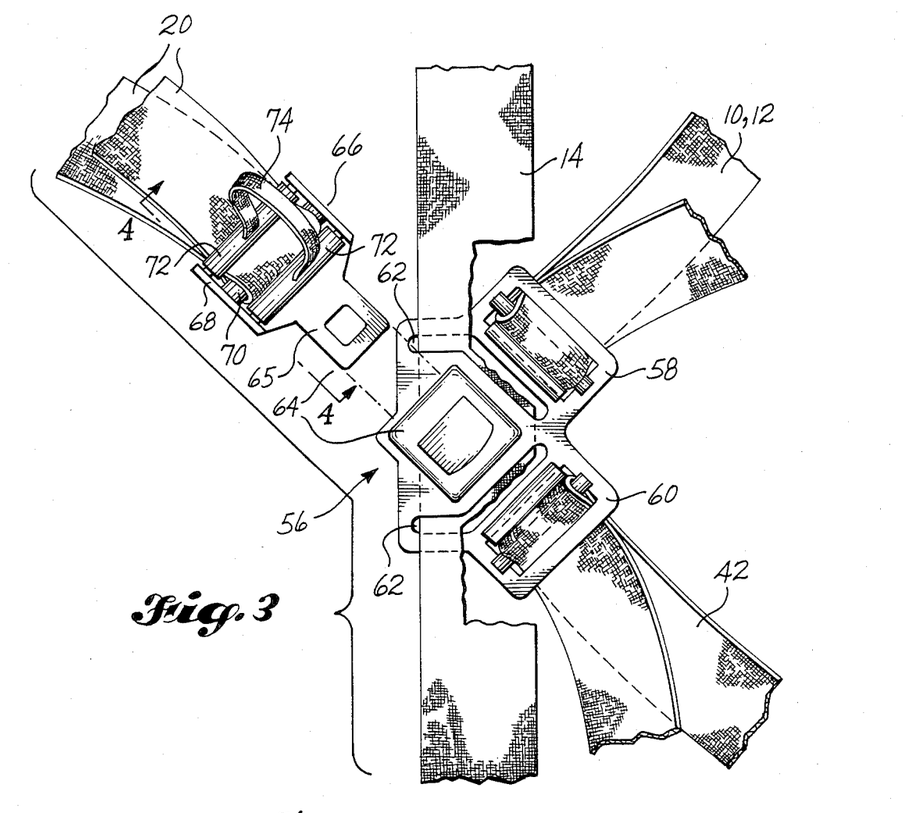
FIG. 3 is a pictorial view of the preferred embodiment of the side anchor fitting.

In each of the two embodiments of the harness 1, 1', a main fitting 56 is provided on each side of the waist of the wearer. This fitting 56 is best seen in FIG. 3. The thigh/lap belt strap 20 extends through the fitting 56 and is releasably locked against movement with respect to the fitting 56. The fitting 56 includes two slots 62 for slidingly receiving the corresponding front vertical web 14 of main strap 10. Front web 14 extends through fitting 56 and downwardly to form the buttocks sling 16. The fitting 56 also has an adjustable connector 58 of the type described above in connection with fitting 26 for receiving the end of main strap 10 that extends from fitting 56 diagonally up and across the back of the wearer. A similar connector 60 is provided for one end of a side anchor strap 42. The other end of the anchor strap 42 is connected to the survival kit 4 as described above. A connector 46 is slidingly received on the midportion of the strap 42 between survival pin connection 44 and main fitting 56 and is connected to the ejection seat 2 by means of a releasable pin connection 48 of a known type, as shown in FIG. 1. The side anchor straps 42 serve to securely anchor the thigh/lap belt strap 20 to ejection seat 2 to prevent submarining of the pelvis of the wearer.

Referring to FIGS. 1-3, the main fitting 56 engages the thigh/lap belt strap 20 by means of a buckle latch 64. The latch 64 includes a connector end 65 through which the strap 20 is looped. The tang of this connector end 65 is received into and releasably secured to the fitting 56 in the same manner that an automobile or aircraft seat belt is commonly latched. This releasable connection is best illustrated in FIG. 3.

Figure 4:
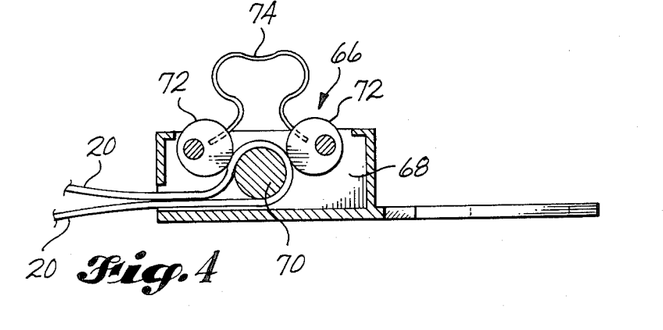
FIG. 4 is a sectional view of the cam lock adjusting mechanism for the thigh strap shown in FIG. 3.

The connector end 65 through which strap 20 is looped includes a snubber 66 for releasably securing the strap 20 against movement in either direction relative to fitting 66. This releasable locking of the strap 20 in position by snubber 66, in combination with the front adjuster 26 described above, makes both the thigh portion 22 and lap portion 24 of the strap 20 fully adjustable to the size of the wearer. Referring to FIGS. 3 and 4, the snubber 66 includes two opposite side members 68 between which a bar or shaft 70 extends. The strap 20 loops around the bar 70 and is secured against movement relative to bar 70 by two locking cams 72. These cams 72 are arranged to engage two generally radially opposite portions of the bar 70. Pulling the strap 20 in one direction causes one cam 72 to tighten against strap 29 and urge it against bar 70, and pulling the strap 20 in the other direction causes the other cam to so tighten strap 20 against bar 70. Thus strap 20 is secured against movement in either direction. When the wearer desires to adjust the tightness of the thigh portions 22 and/or lap portions 24 of the strap 20, he simply pulls on a strap 74 which is attached to each of the cams 72 in a manner that pulling on it will loosen the engagement of both cams 72 against strap 20 and bar 70.

Referring to FIGS. 1 and 2, each embodiment of the harness 1, 1' is provided with connection fittings 8 for connecting parachute risers 6 to the harness 1, 1'. The connection fittings 8 are generally of a known type and will not be described in detail herein. Preferably, the fittings 8 incorporate retraction strap guide fittings 9 for guiding the retraction straps 50 down the front webs 14 to the chest fittings 76, 76'.

Each of the embodiments of the harness 1, 1' is fully adjustable by means of the waist adjuster 26, main fittings 56, and chest strap adjusters 39,86. Thus, the harness 1, 1' may be fully adjusted to the size of a particular wearer to increase the comfort of the harness 1, 1' and insure its proper functioning. In order to remove the harness 1 shown in FIG. 2 for normal ground egress, the wearer simply disengages the two lap buckles 64 and the front chest buckle 38. In the embodiment shown in FIG. 1, egress would be obtained by releasing the lap buckles 64 and disengaging the pin connections 48, 54.

It should be obvious to those skilled in the art to which this invention is addressed that the invention may be used to advantage in a variety of situations and that various modifications, changes, and omissions in form and detail may be made without departing from the spirit and scope of the invention as defined by the following claims.

What is claimed is:

1. An ejection seat restraint/parachute harness, comprising:

continuous strap means for providing a continuous load path beginning at a side front torso location and running diagonally up and across the back, down the front, across and under the buttocks, up the front, and diagonally down and across the back to an opposite side front torso location;

chest strap means for preventing a wearer's shoulders from slipping out of the harness;

thigh strap and lap belt means, extending diagonally upwardly and laterally outwardly across the front of torso location and directly laterally across the front of the lower torso below the chest of the wearer, for preventing the pelvis of the wearer from rotating and slipping out of position; said thigh strap and lap belt means being fixedly attached to said continuous strap means at each of said side front torso locations when the harness is in use; and means for anchoring opposite sides of the thigh strap and lap belt means to an ejection seat, said means for anchoring engaging the thigh strap and lap belt means at said side front torso locations.

2. A harness as described in claim 1, in which the chest strap means completely encircles the chest.

3. A harness as described in claim 2, which further includes a fitting at each of two opposite side front locations on the continuous strap means; and in which the chest strap means includes a back portion extending around the back of the wearer and attached directly to each of said fittings, and a separate front portion extending around the front of the wearer and attached directly to each of said fittings.

4. A harness as described in claim 3, in which the back portion of the chest strap means includes means for adjusting the chest strap means to the size of the wearer.

5. A harness as described in claim 3, in which the front portion of the chest strap means includes a latch fitting for releasably latching the chest strap means around the chest of the wearer.

6. A harness as described in claim 5, in which the back portion of the chest strap means includes means for adjusting the chest strap means to the size of the wearer.

7. A harness as described in claim 2, which further includes a fitting at each of said side front torso locations on the continuous strap means, said fitting attaching a front portion of the continuous strap means to a back portion of the continuous strap means; and in which the thigh strap and lap belt means extends through each of said fittings, said means for anchoring engages said fittings, and each said fitting has means for fixedly engaging the thigh strap and lap belt means.

8. A harness as described in claim 1, which further includes a fitting at each of said side front torso locations on the continuous strap means, said fitting attaching a front portion of the continuous srap means to a back portion of the continuous strap means; and in which the thigh strap and lap belt means extends through each of said fittings, said means for anchoring engages said fittings, and each said fitting has means for fixedly engaging the thigh strap and lap belt means.

9. A harness as described in claim 8, which further comprises adjusting means at a center lower torso location for adjusting the thigh strap and lap belt means to the size of the wearer; and in which the thigh strap and lap belt means extend continuously through each said fitting, and each said fitting includes tightening means for adjusting the thigh strap and lap belt means to the size of the wearer.

10. A harness as described in claim 9, in which the tightening means includes a shaft around which the thigh strap and lap belt means extends, and cam lock means for releasably locking the thigh strap and lap belt means against movement in response to a pulling force on the thigh strap and lap belt means in either direction relative to the shaft.

11. An ejection seat restraint/parachute harness, comprising:

continuous strap means for providing a continuous load path beginning on one side of the waist of a wearer and running diagonally up and across the back, down the front, across and under the buttocks, up the front, and diagonally down and across the back to the opposite side of the waist;

chest strap means for preventing the wearer's shoulders from slipping out of the harness, said chest strap means completely encircling the chest;

thigh strap and lap belt means, extending across a front portion of each thigh and the front of the lower torso below the chest of a wearer, for preventing the pelvis of the wearer from rotating and slipping out of position; and attaching means for attaching the chest strap means to the continuous strap means at each of two opposite side front locations and at a back location where the continuous strap means crosses itself to form an X-shaped configuration.

12. An ejection seat restraint/parachute harness, comprising:

continuous strap means for providing a continuous load path beginning on one side of the waist of a wearer and running diagonally up and across the back, down the front, across and under the buttocks, up the front, and diagonally down and across the back to the opposite side of the waist;

chest strap means for preventing the wearer's shoulders from slipping out of the harness, said chest strap means completely encircling the chest;

thigh strap and lap belt means for preventing the pelvis of the wearer from rotating and slipping out of position; and attaching means for attaching the chest strap means to the continuous strap means at each of two opposite side front locations and at a back location where the continuous strap means crosses itself to form an X-shaped configuration;

in which the attaching means includes a fitting at each of said side front locations; and the chest strap means includes a back portion extending around the back of the wearer and attached to each of said fittings, and a front portion formed by an end portion of each of two haul back straps; said haul back straps extending down opposite side front portions of the continuous strap means to said fittings, slidingly through said fittings, across the chest, and to connector means for connecting the haul back straps to an ejection seat.

13. An ejection seat restraint/parachute harness, comprising:

continuous strap means for providing a continuous load path beginning on one side of the waist of a wearer and running diagonally up and across the back, down the front, across and under the buttocks, up the front, and diagonally down and across the back to the opposite side of the waist;

chest strap means for preventing the wearer's shoulders from slipping out of the harness, said chest strap means completely encircling the chest;

thigh strap and lap belt means for preventing the pelvis of the wearer from rotating and slipping out of position; and a fitting at each of two opposite side front locations on the continuous strap means; said chest strap means including a back portion extending around the back of the wearer and attached to each of said fittings, and a front portion formed by an end portion of each of two haul back straps; and said haul back straps extending down opposite side front portions of the continuous strap means to said fittings, slidingly through said fittings, across the chest, and to connector means for connecting the haul back straps to an ejection seat.

14. A harness as described in claim 13 in which the back portion of the chest strap includes means for adjusting the chest strap means to the size of the wearer.

15. An ejection seat restraint/parachute harness, comprising:

continuous strap means for providing a continuous load path beginning on one side of the waist of a wearer and running diagonally up and across the back, down the front, across and under the buttocks, up the front, and diagonally down and across the back to the opposite side of the waist;

chest strap means for preventing the wearer's shoulders from slipping out of the harness, said chest strap means completely encircling the chest;

thigh strap and lap belt means, extending across a front portion of each thigh and the front of the lower torso below the chest of a wearer, for preventing the pelvis of the wearer from rotating and slipping out of position; and a fitting at each of two opposite side front locations on the continuous strap means;

in which the chest strap means includes a back portion extending around the back of the wearer and attached to each of said fittings, and a front portion extending around the front of the wearer and attached to each of said fittings; and in which the back portion of the chest strap means is attached to the continuous strap means at a location where the continuous strap means crosses itself to form an X-shaped configuration.

16. A harness as described in claim 15, in which the chest strap means includes means for adjusting it to the size of the wearer.

17. An ejection seat restraint/parachute harness, comprising:

continuous strap means for providing a continuous load path beginning on one side of the waist of a wearer and running diagonally up and across the back, down the front, across and under the buttocks, up the front, and diagonally down and across the back to the opposite side of the waist;

chest strap means for preventing the wearer's shoulders from slipping out of the harness, said chest strap means completely encircling the chest;

thigh strap and lap belt means for preventing the pelvis of the wearer from rotating and slipping out of position; and a fitting at each of two opposite side front locations on the continuous strap means; said chest strap means including a back portion extending around the back of the wearer and attached to each of said fittings, and a front portion extending around the front of the wearer and attached to each of said fittings; and each said fitting including portions for slidingly engaging a haul back strap that extends down a side front portion of the continuous strap means to the fitting, through the fitting, and laterally outwardly to connector means for connecting the haul back strap to an ejection seat.

18. A harness as described in claim 17, in which the back portion of the chest strap includes means for adjusting the chest strap means to the size of the wearer.

19. A harness as described in claim 17, in which the front portion of the chest strap means includes a latch fitting for releasably latching the chest strap means around the chest of the wearer.

20. A harness as described in claim 19, in which the chest strap means includes means for adjusting it to the size of the wearer.

21. An ejection seat restraint/parachute harness, comprising:
front strap means;
back strap means;
thigh strap and lap belt means having a thigh portion extending across a front portion of each thigh diagonally upwardly and laterally outwardly from an inner thigh area to a side front torso location on the front strap means, and a lap portion extending between said side front torso locations directly laterally across the front of the lower torso below the chest, for preventing the pelvis of the wearer from rotating and slipping out of position; each of said thigh portion and said lap portion being fixedly attached to each of said side front torso locations when the harness is in use; and
means for anchoring opposite sides of the thigh strap and lap belt means to an ejection seat; said means for anchoring engaging the thigh strap and lap belt means at said side front torso locations.

22. A harness as described in claim 21, which further comprises a fitting at ech of said side front torso locations, and adjusting means at a center location on said lap portion for adjusting the thigh strap and lap belt means to the size of the wearer; and in which said lap portion is an integral continuation of said thigh portion, the thigh strap and lap belt means extends through each of said fittings, and each said fitting includes tightetning means for adjusting the thigh strap and lap belt means to the size of the wearer.

23. A harness as described in claim 22, in which the tightening means includes a shaft around which the thigh strap and lap belt means extends, and cam lock means for releasably locking the thigh strap and lap belt means against movement in response to a pulling force on the thigh strap and lap belt means in either direction relative to the shaft.

24. A harness as described in claim 21, in which the front strap means has an H-shaped configuration, and the back strap means has an X-shaped configuration; and which further comprises a chest strap completely encircling the chest of a wearer.

25. An ejection seat restraint/parachute harness, comprising:
continuous strap means for providing a continuous load path beginning on one side of the waist of a wearer and running diagonally up and across the back, down the front, across and under the buttocks, up the front, and diagonally down and across the back to the opposite side of the waist;
chest strap means completely encircling the chest for preventing the wearer's shoulders from slipping out of the harness;
thigh strap and lap belt means for preventing the pelvis of the wearer from rotating and slipping out of position; and
a fitting at each of two opposite side front locations on the continuous strap means; said chest strap means being attached to each of said fittings; and each said fitting including portions for slidingly engaging a haul back strap that extend down a side front portion of the continuous strap means to the fitting, through the fitting, and laterally to connector means for connecting the haul back strap to an ejection seat.

26. An ejection seat restraint/parachute harness, comprising:
front strap means having opposite side front portions that extend down the front of a wearer;
chest strap means for preventing the wearer's shoulders from slipping out of the harness;
thigh strap and lap belt means for preventing the pelvis of the wearer from rotating and slipping out of position; and
a fitting at ech of two opposite side front locations on said side front portions; said chest strap means being attached to each of said fittings; and each said fitting including portions for slidingly engaging a haul back strap that extends down the corresponding side front portion to the fitting, through the fitting, and laterally to connector means for connecting the haul back strap to an ejection seat.

* * * * *

UNITED STATES PATENT AND TRADEMARK OFFICE
CERTIFICATE OF CORRECTION

PATENT NO. : 4,720,064

DATED : January 19, 1988

INVENTOR(S) : Gerald F. Herndon

It is certified that error appears in the above-identified patent and that said Letters Patent are hereby corrected as shown below:

Column 1, line 66, "Sept. 11,, 1973" should be -- Sept. 11, 1973 --.

Column 5, line 22, "measn" should be -- means --.

Column 5, line 44, "ond" should be -- end --.

Column 7, lines 29 and 30, "strap 29" should be -- strap 20 --.

Claim 22, column 11, line 40, "ech" should be -- each --.

Claim 22, column 11, line 46, "tightenting" should be -- tightening --.

Claim 25, column 12, line 28, "extend" should be -- extends --.

Claim 26, column 12, 8th line from the end, "ech" should be -- each --.

Signed and Sealed this

Twelfth Day of July, 1988

*Attest:*

DONALD J. QUIGG

*Attesting Officer*  *Commissioner of Patents and Trademarks*